(12) United States Patent
Kim et al.

(10) Patent No.: US 8,917,666 B2
(45) Date of Patent: Dec. 23, 2014

(54) WIRELESS NETWORK USING NETWORK CODING, AND METHOD OF ADAPTIVELY ADJUSTING BUFFERING TIME IN WIRELESS NETWORK

(75) Inventors: Jae Hyun Kim, Suwon-si (KR); Sung Hyun Cho, Jinju-si (KR); Kwang Taik Kim, Yongin-si (KR); Won Jong Noh, Yongin-si (KR)

(73) Assignees: Samsung Electronics Co., Ltd., Suwon-si (KR); Industry-Academic Cooperation Foundation Gyeongsang National University, Jinju-si (KR)

( * ) Notice: Subject to any disclaimer, the term of this patent is extended or adjusted under 35 U.S.C. 154(b) by 98 days.

(21) Appl. No.: 13/593,002

(22) Filed: Aug. 23, 2012

(65) Prior Publication Data

US 2013/0051324 A1    Feb. 28, 2013

(30) Foreign Application Priority Data

Aug. 24, 2011 (KR) .................. 10-2011-0084649

(51) Int. Cl.
*H04W 4/00* (2009.01)
*H04L 12/841* (2013.01)
*H04W 28/14* (2009.01)

(52) U.S. Cl.
CPC ............... *H04L 47/28* (2013.01); *H04W 28/14* (2013.01)
USPC ........................................................ 370/328

(58) Field of Classification Search
None
See application file for complete search history.

(56) References Cited

U.S. PATENT DOCUMENTS

| 6,466,546 | B1 * | 10/2002 | Tsukamoto | 370/235 |
|---|---|---|---|---|
| 7,170,901 | B1 * | 1/2007 | Katzur | 370/412 |
| 7,408,938 | B1 | 8/2008 | Chou et al. | |
| 8,081,641 | B2 * | 12/2011 | Katabi et al. | 370/400 |
| 2004/0141511 | A1 * | 7/2004 | Rune et al. | 370/401 |
| 2005/0152391 | A1 | 7/2005 | Effros et al. | |
| 2009/0003216 | A1 * | 1/2009 | Radunovic et al. | 370/237 |
| 2009/0086664 | A1 * | 4/2009 | Wu | 370/328 |

FOREIGN PATENT DOCUMENTS

| KR | 10-0959065 | 5/2010 |
|---|---|---|
| KR | 10-2010-0078405 A | 7/2010 |

OTHER PUBLICATIONS

Bhadra, Sandeep, et al., (Dec. 2010), "Buffer Asymptotics for Coding Over Networks," *IEEE Transactions on Information Theory*, vol. 56, No. 12, pp. 6159-6181.
Jardosh, Sunil, et al., (2008). "Effect of Network Coding on Buffer Management in Wireless Sensor Network," *ISSNIP*. pp. 157-162.

\* cited by examiner

*Primary Examiner* — Hassan Kizou
*Assistant Examiner* — Tejis Daya
(74) *Attorney, Agent, or Firm* — NSIP Law

(57) ABSTRACT

A wireless network using network coding, and a method of adaptively adjusting buffering time in the wireless network, are provided. A communication method of a cross node in a wireless network, includes determining information associated with a number of hops between a source node and the cross node, and/or a number of hops between the cross node and a destination node. The method further includes adaptively adjusting a buffering time at the cross node based on the information. The method further includes buffering a packet received by the cross node based on the adjusted buffering time. The method further includes performing network coding of the buffered packet and another packet.

22 Claims, 11 Drawing Sheets

C3: NOT PERFORM NETWORK CODING

<USING AVERAGE NUMBER OF HOPS>

FIG. 7B

<USING NUMBER OF HOPS IN PATH TO SOURCE NODE>

FIG. 8

TIME EXPENDED FOR TRANSMITTING PACKET FROM CROSS NODE, WHERE RLNC IS PERFORMED, TO DESTINATION NODE

TIME EXPENDED FOR TRANSMITTING PACKET FROM SOURCE NODE TO CROSS NODE, WHERE RLNC IS PERFORMED

FIG. 9

| ADDRESS OF CROSS NODE |
| --- |
| INDEX OF RLNC SET |
| ADDRESS OF SOURCE NODE |
| ADDRESS OF DESTINATION NODE |
| NUMBER OF HOPS |
| NUMBER OF CASCADE CROSS NODES |

<CONFIGURATION OF NOTIFICATION MESSAGE>

WIRELESS NETWORK USING NETWORK CODING, AND METHOD OF ADAPTIVELY ADJUSTING BUFFERING TIME IN WIRELESS NETWORK

CROSS-REFERENCE TO RELATED APPLICATION(S)

This application claims the benefit under 35 U.S.C. §119 (a) of Korean Patent Application No. 10-2011-0084649, filed on Aug. 24, 2011, in the Korean Intellectual Property Office, the entire disclosure of which is incorporated herein by reference for all purposes.

BACKGROUND

1. Field

The following description relates to a wireless network using network coding.

2. Description of Related Art

A network coding scheme may refer to a coding scheme performed in a network layer. When pieces of input data are combined based on the network coding scheme, efficiency in using communication resources may be improved. Examples of the network coding scheme may include an exclusive or (XOR) network coding scheme, a random linear network coding (RLNC) scheme, and the like.

To apply an RLNC scheme to a wireless network, a data packet needs to be appropriately buffered at a cross node that performs network coding. According to the RLNC scheme, the cross node may perform network coding based on a batch set unit, and the cross node may be determined based on a routing path. In this example, a coding failure ratio may increase due to traffic asynchronization in the wireless network. The coding failure ratio may refer to a ratio of a number of cross nodes that do not perform network coding due to the traffic asynchronization, to a total number of cross nodes. When the coding failure ratio increases, a coding gain associated with network coding may decrease.

SUMMARY

In one general aspect, there is provided a communication method of a cross node in a wireless network, including determining information associated with a number of hops between a source node and the cross node, and/or a number of hops between the cross node and a destination node. The method further includes adaptively adjusting a buffering time at the cross node based on the information. The method further includes buffering a packet received by the cross node based on the adjusted buffering time. The method further includes performing network coding of the buffered packet and another packet.

The method further includes buffering the other packet received by the cross node based on the adjusted buffering time. The method further includes performing network coding of the buffered packet and the buffered other packet.

The method further includes skipping the buffering and the performing of the network coding of the other packet when the other packet is not received within the adjusted buffering time. The buffering of the packet includes buffering the packet within the adjusted buffering time.

The adjusting includes adaptively adjusting the buffering time to be longer than a predetermined minimum buffering time.

The adjusting includes determining a minimum buffering time. The adjusting further includes adaptively adjusting the buffering time based on the minimum buffering time.

The adjusting includes determining an average number of hops of each path in the wireless network, and/or a greatest number of hops among numbers of hops between the cross node and each of source nodes associated with packet flows intersecting at the cross node. The adjusting further includes adaptively adjusting the buffering time based on the average number of hops, and/or the greatest number of hops.

The adjusting includes determining whether packets transmitted by the cross node are real-time traffic or non-real-time traffic. The adjusting further includes adaptively adjusting the buffering time based on whether the packets transmitted by the cross node are the real-time traffic or the non-real-time traffic.

The adjusting includes determining an allowable delay of a packet flow transmitted from the source node to the destination node, the number of hops between the source node and the cross node, and the number of hops between the cross node and the destination node. The adjusting further includes adaptively adjusting the buffering time based on the allowable delay of the packet flow, the number of hops between the source node and the cross node, and the number of hops between the cross node and the destination node.

A non-transitory computer-readable storage medium stores a program including instructions to cause a computer to implement the method.

In another general aspect, there is provided a communication method of a first cross node in a wireless network including the first cross node and a second cross node, including receiving, from the second cross node, a notification message including a number of hops between a source node and the second cross node. The method further includes adaptively adjusting a buffering time at the first cross node based on the notification message. The method further includes performing network coding associated with a packet flow received by the first cross node based on the adjusted buffering time. The method further includes updating the notification message. The method further includes transmitting, to a subsequent node, the updated notification message.

The method further includes receiving the updated notification message. The method further includes detecting a loop of cross nodes including the first cross node when the updated notification message is received. The method further includes canceling the network coding associated with the packet flow based on the detecting.

The method further includes transmitting a cancellation message to inform other nodes of the canceling of the network coding associated with the packet flow.

The notification message includes an address of the second cross node, or an index of a set of nodes associated with the network coding, or an address of the source node associated with the packet flow, or an address of a destination node associated with the packet flow, or a number of cascade cross nodes associated with the packet flow, or any combination thereof.

The network coding includes random linear network coding.

The transmitting further includes transmitting, to the subsequent node, the updated notification message when the subsequent node is not associated with the packet flow.

The transmitting further includes generating a data packet including a header, the header including the updated notification message, when the subsequent node is associated with the packet flow. The transmitting further includes transmitting, to the subsequent node, the data packet.

The updating further includes updating the number of hops between the source node and the second cross node to include a number of hops between the source node and the first cross node.

A non-transitory computer-readable storage medium storing a program including instructions to cause a computer to implement the method.

In still another general aspect, there is provided an apparatus including a processor configured to determine information associated with a packet flow received by the processor. The processor is further configured to adaptively adjust a buffering time at the processor based on the information. The processor is further configured to buffer the packet flow based on the adjusted buffering time. The processor is further configured to perform network coding associated with the packet flow.

The information includes an address of a cross node associated with the packet flow, or an index of a set of nodes associated with network coding, or an address of a source node associated with the packet flow, or an address of a destination node associated with the packet flow, or a number of hops between the source node and the cross node, or a number of cascade cross nodes associated with the packet flow, or any combination thereof.

Other features and aspects may be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1A:
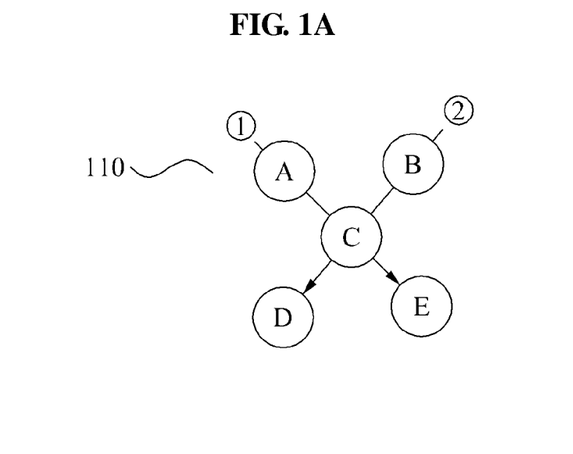
FIGS. 1A through 1C are diagrams illustrating an example of a network that performs network coding based on a buffering time, and examples of the buffering time.
Figure 1B:
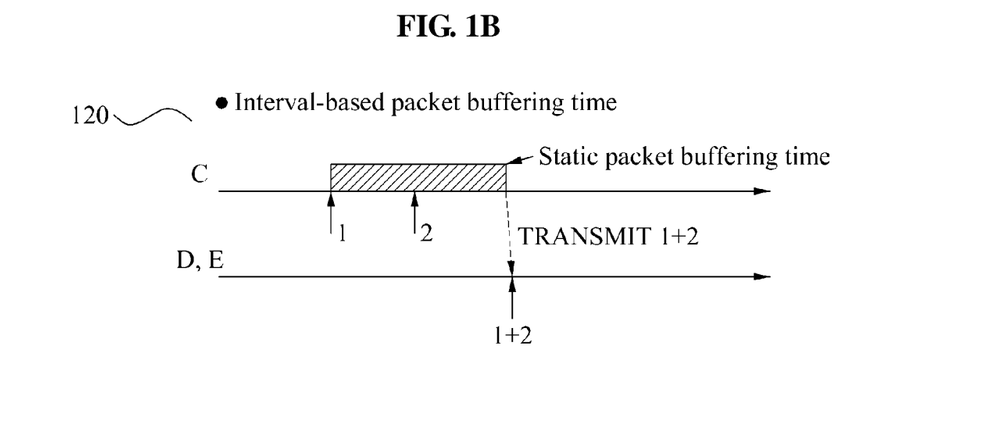
Figure 1C:
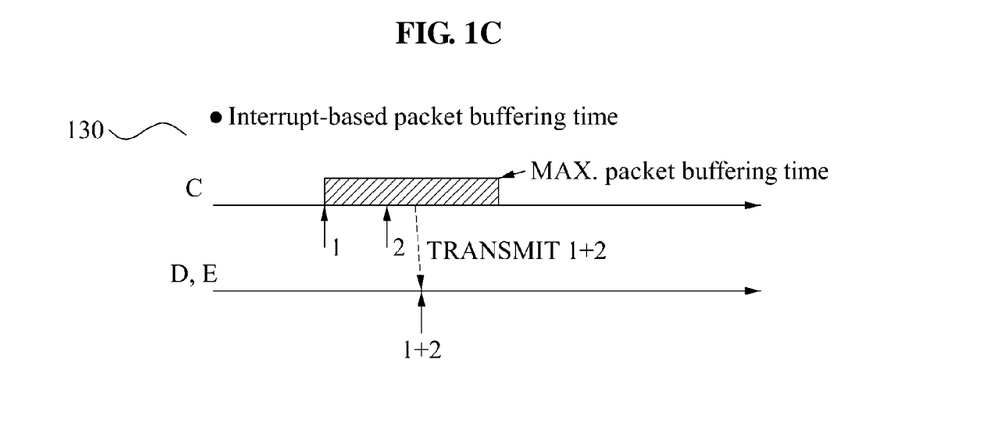

FIGS. 1A through 1C illustrate an example of a network that performs network coding based on a buffering time, and examples of the buffering time. Referring to FIG. 1A, a wireless network 110 includes a node A, a node B, a node C, a node D, and a node E. The node A transmits a flow 1 (e.g., a data flow) to the node E via the node C, and the node B transmits a flow 2 to the node D via the node C. The flow 1 and the flow 2 intersect at the node C, and thus, the node C performs network coding, for example, a random linear network coding (RLNC), as a cross node.

Hereinafter, the node C is referred to as a cross node C. The cross node C buffers, during a predetermined buffering time, packets of a flow that reaches the cross node C first, between the flow 1 and the flow 2. In other examples, the buffering time may be adaptively adjusted. The cross node C further performs network coding of the buffered packets and packets of a flow that subsequently reaches the cross node C.

FIGS. 1B and 1C describe operations of the cross node C when the buffering time is static. Referring to FIG. 1B, the cross node C uses an interval-based packet buffering time 120. The cross node C buffers the flow 1 reaching the cross node C first during the buffering time 120. Although the flow 2 reaches the cross node C while the cross node C is buffering the flow 1, the cross node C buffers the flow 1 and the flow 2 during the buffering time 120. When the buffering time 120 expires, the cross node C transmits, to the node D and the node E, network-coded packets generated based on the flow 1 and the flow 2.

Referring to FIG. 1C, the cross node C uses an interrupt-based packet buffering time 130. The cross node C buffers the flow 1 that reaches the cross node C first. When the flow 2 reaches the cross node C while the cross node C is buffering the flow 1, the cross node C generates network-coded packets based on the flow 1 and the flow 2. Although the buffering time 130 is still in progress (e.g., the maximum packet buffering time has not been reached), the cross node C transmits, to the node D and the node E, the network-coded packets.

Figure 2A:
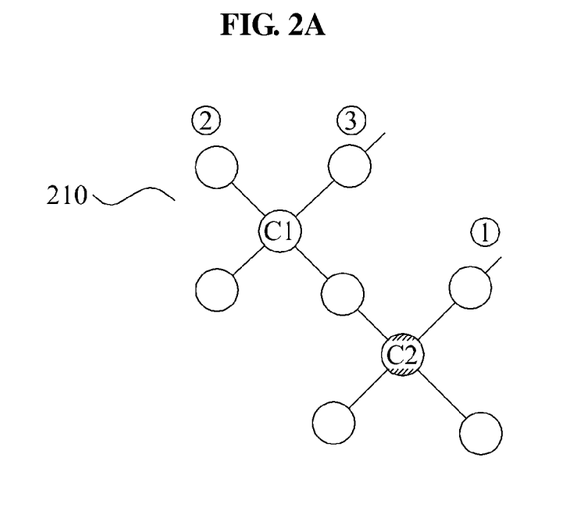
FIGS. 2A and 2B are diagrams illustrating an example of a network including two cross nodes that perform network coding based on a buffering time, and an example of the buffering time.
Figure 2B:
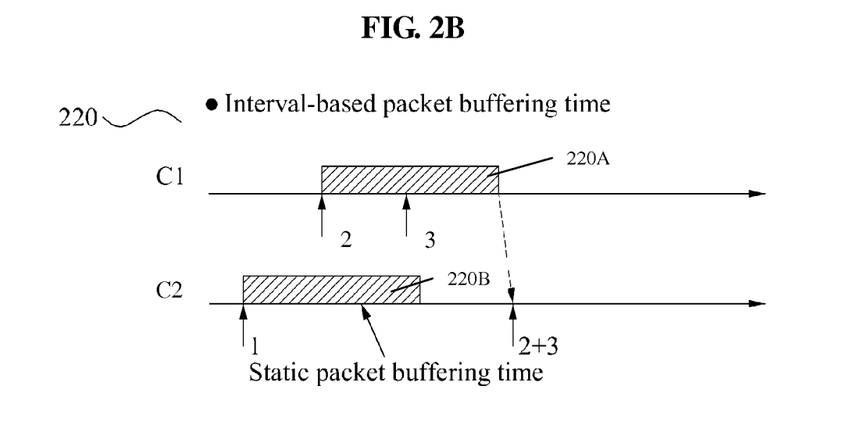

FIGS. 2A and 2B illustrate an example of a network including two cross nodes that perform network coding based on a buffering time, and an example of the buffering time. Referring to FIG. 2A, a wireless network 210 includes nodes. A source node 1 transmits a flow 1 to a destination node 1 via a node C2, a source node 2 transmits a flow 2 to the destination node 2 via a node C1, and a source node 3 transmits a flow 3 to the destination node 3 via the node C1. Both the flow 2 and the flow 3 intersect at the node C1, and both the flow 1 and the flow 2 intersect at the node C2. Thus, both the node C1 and the node C2 are cross nodes.

Referring to FIG. 2B, each of the cross nodes C1 and C2 uses an interval-based buffering time 220. The cross node C2 buffers the flow 1 that reaches the cross node C2 first during a static packet buffering time 220B. The cross node C1 buffers the flow 2 that reaches the cross node C1 first during a static packet buffering time 220A. Although the flow 3 reaches the cross node C1 while the cross node C1 is buffering the flow 2, the cross node C1 buffers the flow 2 and the flow 3 during the static packet buffering time 220A. When the buffering time 220A expires, the cross node C1 transmits, to the cross node C2, network-coded packets generated based on the flow 2 and the flow 3.

In this example, the network-coded packets transmitted from the cross node C1 reach the cross node C2 after the buffering time 220B of the cross node C2 expires. Further, the cross node C2 does not perform network coding of the flow 1 and network-coded packets transmitted from the cross node C1, and does not perform network coding. Thus, a coding gain in the wireless network 210 of FIG. 2A decreases.

Figure 3A:
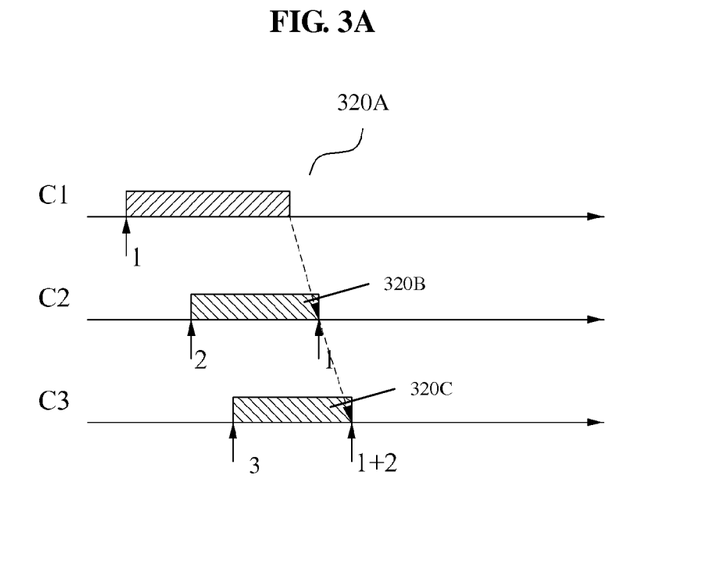
FIGS. 3A and 3B are diagrams illustrating an example of a network including cross nodes that form a loop and that perform network coding based on a buffering time, and an example of the buffering time.
Figure 3B:
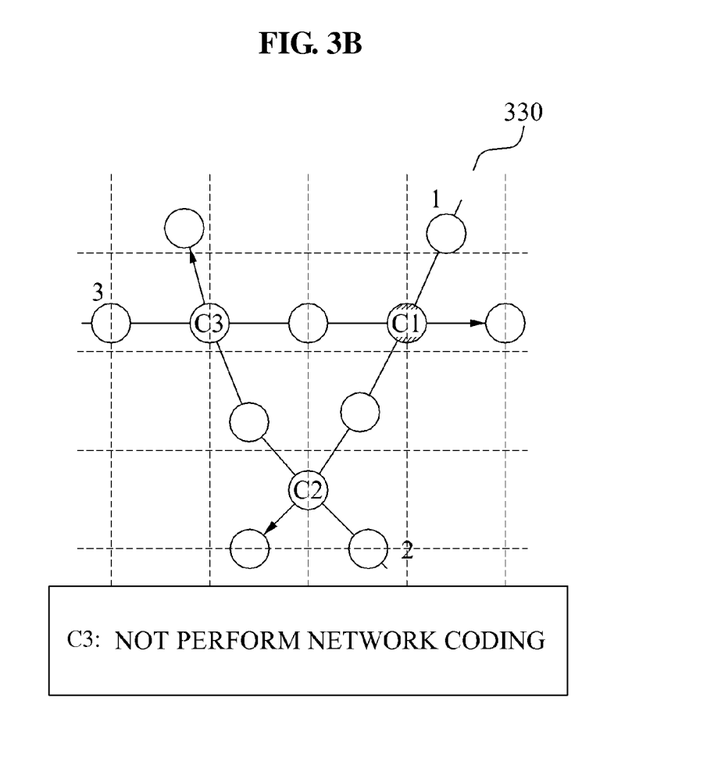

FIGS. 3A and 3B illustrate an example of a network including cross nodes that form a loop and that perform network coding based on a buffering time, and an example of the buffering time. Referring to FIG. 3B, a wireless network 330 includes a cross node C1, a cross node C2, and a cross node C3. A source node 1 transmits a flow 1 to a destination node 1 via the cross nodes C1 and C2, a source node 2 transmits a flow 2 to the destination node 2 via the cross nodes C2 and C3, and a source node 3 transmits a flow 3 to the destination node 3 via the cross nodes C1 and C3. Both the flow 1 and the flow 3 intersect at the node C1, both the flow 1 and the flow 2 intersect at the node C2, and both the flow 2 and the flow 3 intersect at the node C3. The cross node C3 does not perform network coding.

In more detail, referring to FIG. 3A, the cross node C1 buffers the flow 1 that reaches the cross node C1 first during a buffering time 320A. The cross node C2 buffers the flow 2 that reaches the cross node C2 first during a buffering time 320B. The cross node C3 buffers the flow 3 that reaches the cross node C3 first during a buffering time 320C. When the buffering time 320A expires, the cross node C1 transmits, to the cross node C2, packets of the flow 1. When the buffering time 320B expires, the cross node C2 transmits, to the cross node C3, network coded packets generated based on the flow 1 and the flow 2. However, the network coded packets transmitted from the cross node C2 reach the cross node C3 after the buffering time 320C of the cross node C3 expires. Thus, the cross node C3 does not perform network coding of the flow 3 and the network coded packets transmitted from the cross node C3.

Referring again to FIGS. 1A through 3B, a cross node that does not perform network coding may be created when a flow arrives late from a previous cross node, for example, when cross nodes form a loop. Accordingly, a number of cross nodes that do not perform network coding may be reduced by adaptively adjusting a buffering time of a cross node.

Figure 4:
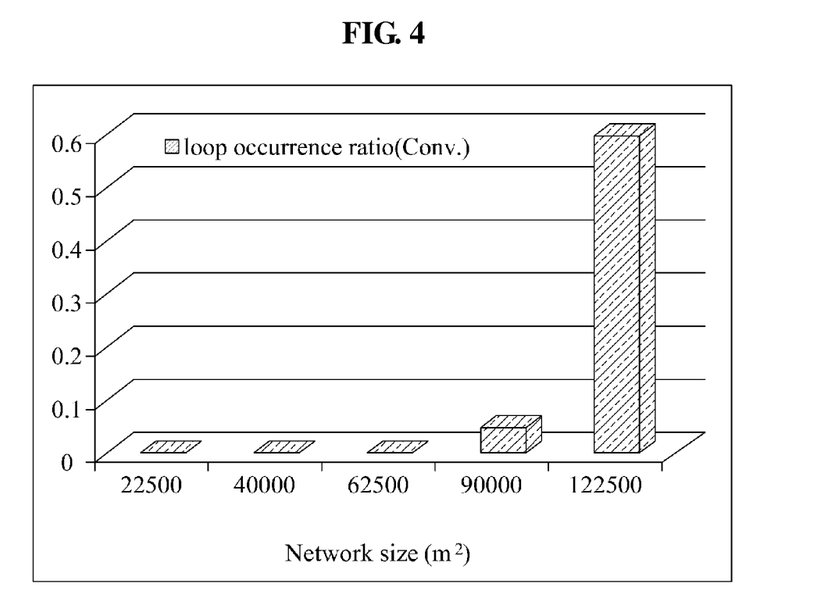
FIG. 4 is a graph illustrating an example of a loop occurrence ratio based on a size of a network.

FIG. 4 is a graph illustrating an example of a loop occurrence ratio based on a size of a network. The loop occurrence ratio refers to a ratio of a number of cross nodes that form a loop, to a total number of cross nodes. As the size (e.g., area) of the network increases, the loop occurrence ratio increases. Accordingly, the graph shows that a network coding failure ratio increases as the size of the network increases.

Figure 5:
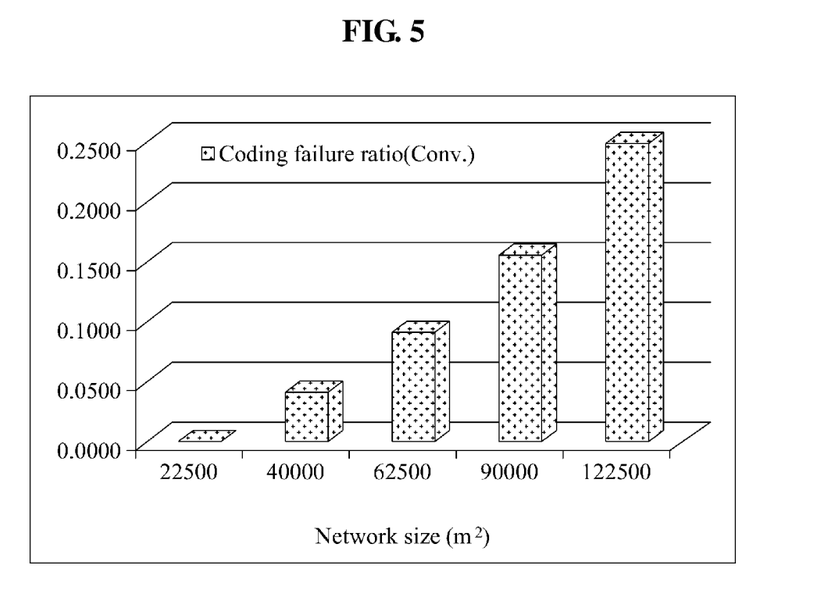
FIG. 5 is a graph illustrating an example of a network coding failure ratio based on a size of a network.

FIG. 5 is a graph illustrating an example of a network coding failure ratio based on a size of a network. The coding failure ratio may refer to a ratio of a number of cross nodes that do not perform network coding, to a total number of cross nodes. As the size (e.g., area) of the network increases, the network coding failure ratio increases.

Figure 6:
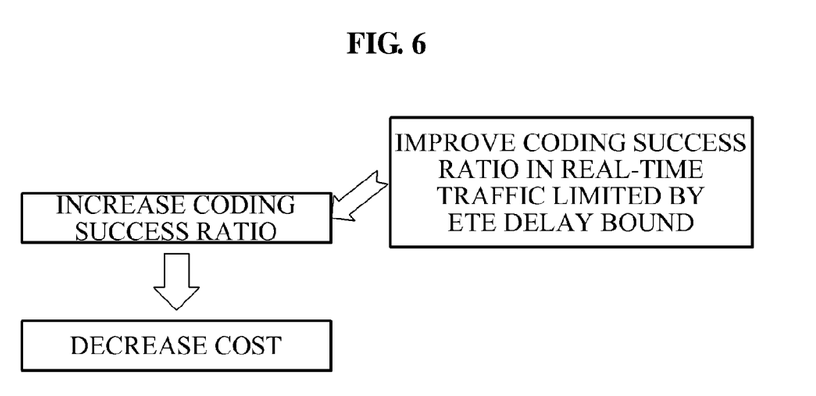
FIG. 6 is a diagram illustrating an example of effects of a network that performs network coding based on adaptively adjusting a buffering time.

FIG. 6 illustrates an example of effects of a network that performs network coding based on adaptively adjusting a buffering time. The network increases a coding success ratio of the network, and thus, efficiency in utilizing radio resources (e.g., nodes) of the network may be maximized and a communication cost is decreased. To increase the coding success ratio, the network adaptively adjusts a buffering time of at least one cross node, and therefore, the network coding success ratio in real-time traffic limited by an end-to-end (ETE) delay bound, is improved.

Figure 7A:
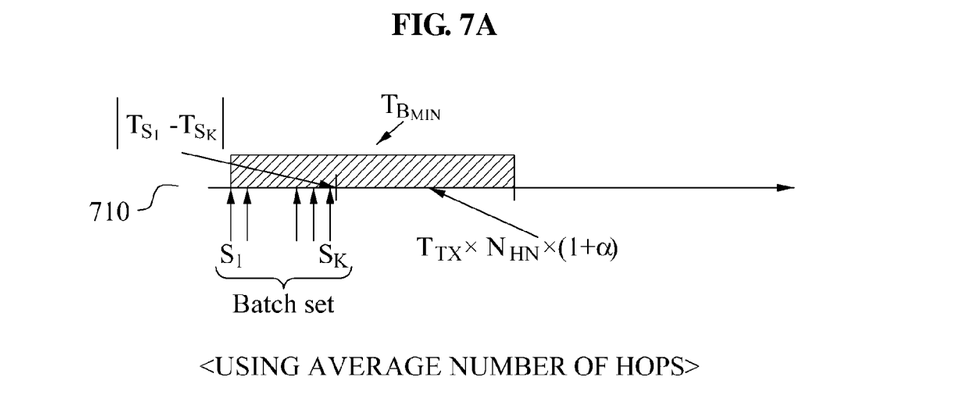
FIGS. 7A and 7B are diagrams illustrating examples of calculating a minimum buffering time.
Figure 7B:
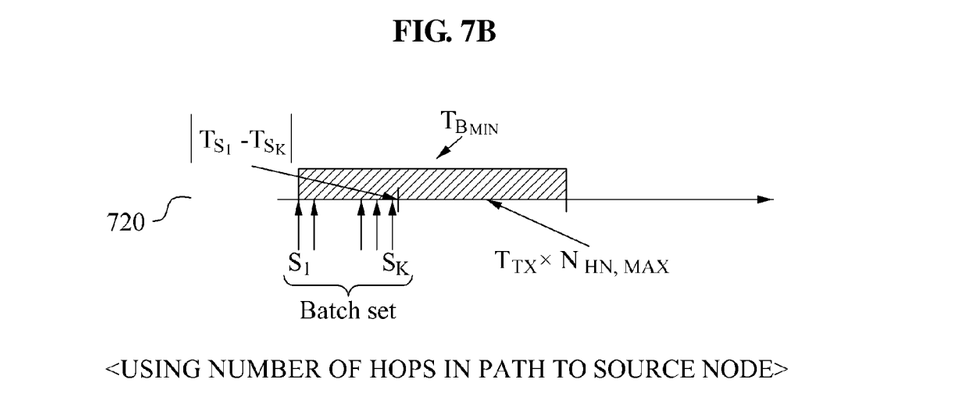

FIGS. 7A and 7B illustrate examples of calculating a minimum buffering time $T_{BMIN}$. $T_{BMIN}$ may be predetermined, and is used to determine a buffering time of at least one cross node in a network.

Referring to FIG. 7A, when an average number of hops included in each path existing in a wireless network is $N_{HN}$, $T_{BMIN}$ 710 may be defined as expressed by Equation 1. $T_{BMIN}$ 710 denotes a minimum buffering time required to perform network coding at a cross node.

$$T_{BMIN} = |T_{S_1} - T_{S_K}| + T_{TX} \times N_{HN} \times (1+\alpha), \quad \text{[Equation 1]}$$

for $S_k$, $1 \leq k \leq K$, $T_{S_1} \leq T_{S_2} \leq \ldots \leq T_{S_K}$

In Equation 1, $T_{TX}$ denotes a packet transmission time at a hop, $T_{S_k}$ denotes a generation time of a $k^{th}$ source packet generated in a batch set S, and $\alpha$ denotes an average deviation of $N_{HN}$. In this example, $N_{HN}$ may be shared among nodes, and may be transmitted to the nodes through a notification message.

Equation 1 uses the average number of hops $N_{HN}$ as a factor, and Equation 2 uses a number of hops actually existing as a factor. Referring to FIG. 7B, when a greatest number of hops among numbers of hops between a cross node and each source node is $N_{HS,MAX}$, $T_{BMIN}$ 720 may be defined as expressed by Equation 2.

$$T_{BMIN} = T_{S_1} - T_{S_K} + T_{TX} \times N_{HS,MAX}, \quad \text{[Equation 2]}$$

for $S_k$, $1 \leq k \leq K$, $T_{S_1} \leq T_{S_2} \leq \ldots \leq T_{S_K}$

When an ad hoc on-demand distance vector (AODV) is used as a routing algorithm, a number of hops from a corresponding node to a source node is recorded in a reverse path table, and thus, $N_{HS,MAX}$ may be readily obtained.

In examples, $T_{BMIN}$ obtained based on Equation 1, Equation 2, and equations modified from them may be set as a threshold time, and a buffering time of at least one cross node is set to be longer than $T_{BMIN}$. With respect to traffic, for example, to real-time traffic, the buffering time is set based on $T_{BMIN}$ and an allowable end-to-end delay as described with reference to FIG. 8.

Figure 8:
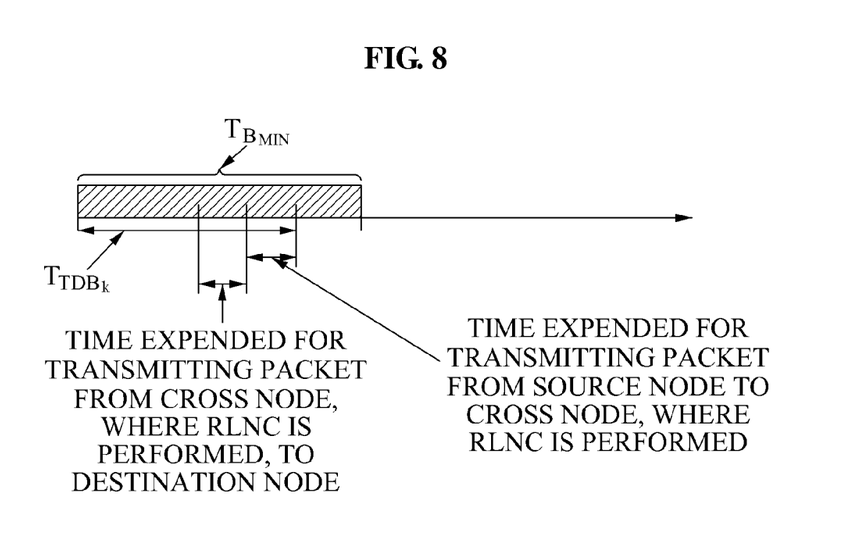
FIG. 8 is a diagram illustrating an example of a maximum buffering time.

FIG. 8 illustrates an example of a maximum buffering time. In examples, cross nodes adaptively determine a buffering time based on whether corresponding traffic is real-time traffic or non-real-time traffic. That is, an allowable end-to-end delay from a source node to a destination node is taken into consideration more significantly in the real-time traffic than in the non-real-time traffic. Therefore, with respect to the real-time traffic, a cross node adjusts a buffering time at the cross node based on an allowable delay of a flow transmitted from a source node to a destination node, a number of hops from the source node to the cross node, and a number of hops from the cross node to the destination node. Conversely, with respect to the non-real-time traffic, the cross node adjusts a buffering time to be longer than $T_{BMIN}$. In this example, $T_{BMIN}$ may change at short-term intervals or long-term intervals.

With respect to the real-time traffic, a maximum buffering time $T_{B_{MAX,i}}$ at a cross node i may be defined as expressed by Equation 3.

$$T_{B_{MAX,i}} \leq \min\left(T_{B_{MIN}}, \frac{1}{N_{CP,MAX}} \min_{k \in RLNCset}(T_{TDB_k} - T_{TX} \times (N_{HS_k} + N_{HD_k}))\right)$$ [Equation 3]

In Equation 3, $N_{CP,MAX}$ denotes a greatest number of flows among numbers of flows intersecting at each cascade intersection point or cross node, and $T_{TDB_k}$ denotes an allowable end-to-end delay of a flow k. Also, $N_{HS_k}$ denotes a number of hops between a cross node performing network coding and a source node corresponding to the flow k. $N_{HD_k}$ denotes a number of hops between the cross node performing network coding and a destination node corresponding to the flow k.

With respect to non-real-time traffic, $T_{B_{MAX,i}}$ at a cross node i may be defined as expressed by Equation 4.

$$T_{B_{MAX,i}} \geq T_{B_{MIN}}$$ [Equation 4]

As shown in FIG. 8, $T_{B_{MAX,i}}$ includes $T_{TDB_k}$, $T_{TDB_k}$ includes a time expended to transmit a packet from the cross node to the destination node corresponding to the flow k, and a time expended to transmit the packet from the source node to the cross node corresponding to the flow k.

Therefore, with respect to the real-time traffic, a buffering time is adaptively adjusted based on Equation 3 or a modified version of Equation 3, and with respect to the non-real-time traffic, a buffering time is adaptively adjusted based on Equation 4 or a modified version of Equation 4. Accordingly, with respect to the non-real-time traffic, a network coding failure ratio is reduced, and with respect to the real-time traffic, an allowable end-to-end delay is satisfied.

Figure 9:
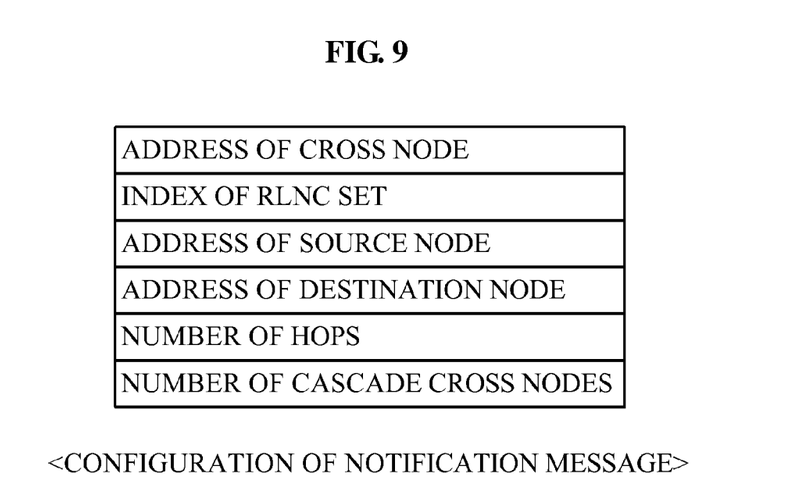
FIG. 9 is a diagram illustrating an example of a configuration of a notification message.

FIG. 9 illustrates an example of a configuration of a notification message. As discussed above with reference to FIG. 7B, information associated with a number of hops from a source node to a cross node may need to be transferred to adaptively adjust a buffering time of at least one cross node, and to remove a loop formed by cross nodes. To effectively share such information among the cross nodes, the cross nodes may use a notification message, for example, the notification message of FIG. 9.

Referring to FIG. 9, the notification message includes an address of a cross node, an index of an RLNC set, an address of a source node, an address of a destination node, a number of hops between the source node and the cross node, and a number of cascade cross nodes. The notification message may additionally include an average number of hops between the source node and each cross node, instead of a number of hops between the source node and the cross node. Also, the notification message may include a greatest number of hops among numbers of hops between the cross node and each source node, with respect to a corresponding flow.

In more detail, the address of the cross node denotes an address of the cross node that transmits the notification message. The index of the RLNC set may be an index for a set of nodes associated with network coding, and may denote an index for a set of nodes existing in a path and cross nodes performing network coding with respect to a corresponding flow. The notification message may be generated for each index of the RLNC set or for each flow, and thus, an index of a flow in the RLNC set may indicate the flow with which the corresponding notification message is associated. The address of the source node denotes an address of the source node of the corresponding flow, and the address of the destination node denotes an address of the destination node of the corresponding flow. The number of hops between the source node and the cross node denotes a number of hops between the source node of the corresponding flow and the cross node. The number of cascade cross nodes denotes a number of cross nodes cascaded with respect to the corresponding flow. Examples of applications of the notification message will be described with reference to FIGS. 10 through 13.

Figure 10:
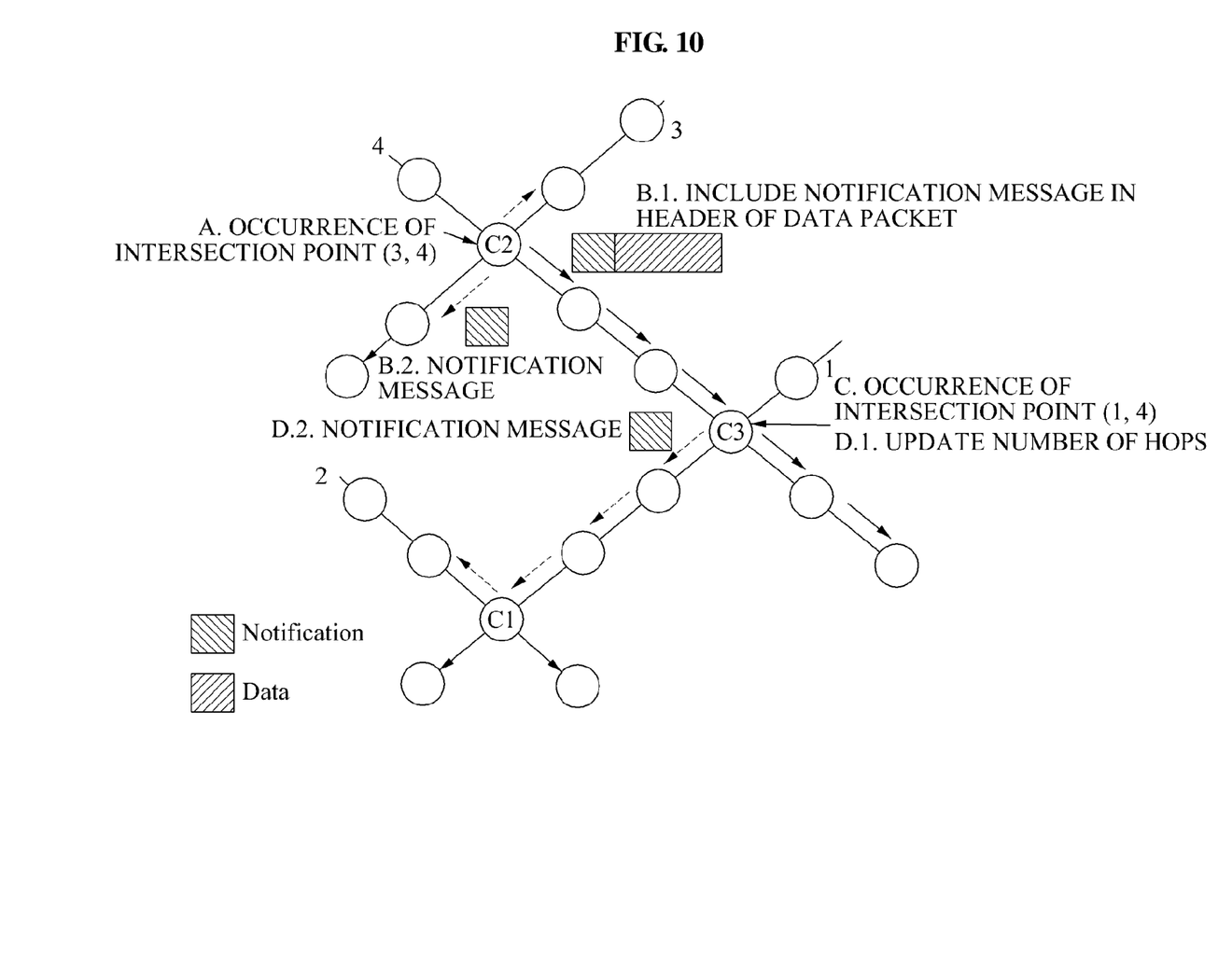
FIG. 10 is a diagram illustrating an example of a process of transferring a notification message and a data packet in a wireless network including at least two cross nodes.

FIG. 10 illustrates an example of a process of transferring a notification message and a data packet in a wireless network including at least two cross nodes. A wireless network includes a cross node C1, a cross node C2, and a cross node C3. A flow 1 and a flow 2 intersect at the cross node C1, a flow 3 and a flow 4 intersect at the cross node C2 (as shown in operation A), and a flow 1 and a flow 4 intersect at the cross node C3 (as shown in operation C).

The cross node C2 is newly-created. When the cross node C2 is newly-created, the cross node C2 generates a notification message associated with the flow 4, including an address of the cross node C2, an index of an RLNC set associated with the flow 4, an address of a source node corresponding to the flow 4, an address of a destination node corresponding to the flow 4, a number of hops between the source node and the cross node C2, and a number of cascade cross nodes associated with the flow 4. Also, the cross node C2 generates a notification message associated with the flow 3, including the address of the cross node C2, an index of an RLNC set associated with the flow 3, an address of a source node corresponding to the flow 3, an address of a destination node corresponding to the flow 3, and a number of hops between the source node and the cross node C2, and a number of cascade cross nodes associated with the flow 3. Hereinafter, only the flow 4 will be described.

The cross node C2 transmits a notification message associated with a flow to connected nodes. In this example, the cross node C2 transmits the notification message, individually, to nodes that are not associated with the flow, and transmits the notification message to nodes that are associated with the flow by including the notification message in a header of a data packet. Referring to FIG. 10, for example, the cross node C2 transmits the notification message to nodes associated with the flow 4 by including the notification message in a header of a data packet (as shown in operation B.1), and transmits the notification message, individually, to nodes that are not associated with the flow 4 (as shown in operation B.2). Therefore, overhead due to transmission of the notification message, is reduced.

A node that receives the notification message, may update the notification message, namely, a number of hops between a source node and the corresponding node and a number of cascade cross nodes associated with the flow. The node may transmit the updated notification message to a subsequent node. When the node that receives the notification message is a cross node performing network coding, the cross node may generate a new notification message.

For example, when the cross node C3 receives the notification message transmitted from the cross node C2 via two nodes, the cross node C3 generates a new notification message (as shown in operation D.1). That is, the cross node C3 generates, based on varied pieces of information included in the received notification message, the new notification message associated with the flow 4, including an address of the cross node C3, the index of the RLNC set associated with the flow 4, the address of the source node corresponding to the flow 4, the address of the destination address corresponding to the flow 4, a number of hops between the source node and the cross node C3, and the number of cascade cross nodes associated with the flow 4. In this example, the cross node C3 transmits the new notification message, individually, to nodes that are not associated with the flow 4 (as shown in operation D.2), and transmits the notification message to nodes that are associated with the flow 4 by including the notification message in a header of a data packet.

Also, a destination node may not be a cross node that performs network coding with respect to a corresponding flow, and thus, a notification message may be transmitted to another node before the destination node. Based on the processes described in the foregoing, a notification message associated with a flow is transmitted to cross nodes associated with the flow, and the cross nodes adaptively adjust a buffering time of the cross nodes based on information included in the notification message.

When nodes in the wireless network use an AODV algorithm as a routing algorithm, the notification message includes a greatest number of hops among numbers of hops between a cross node and each source node, that is, $N_{HS,MAX}$ in Equation 2, instead of a number of hops between the source node and a corresponding node. When the AODV algorithm is used as the routing algorithm, and the notification message includes the greatest number of hops among numbers of hops between the source node and each node, a buffering time of the corresponding node is adjusted based on Equation 2 or a modified Equation 2. Also, the notification message may include the number of hops between the source node and the corresponding node, as described in the foregoing.

Figure 11:
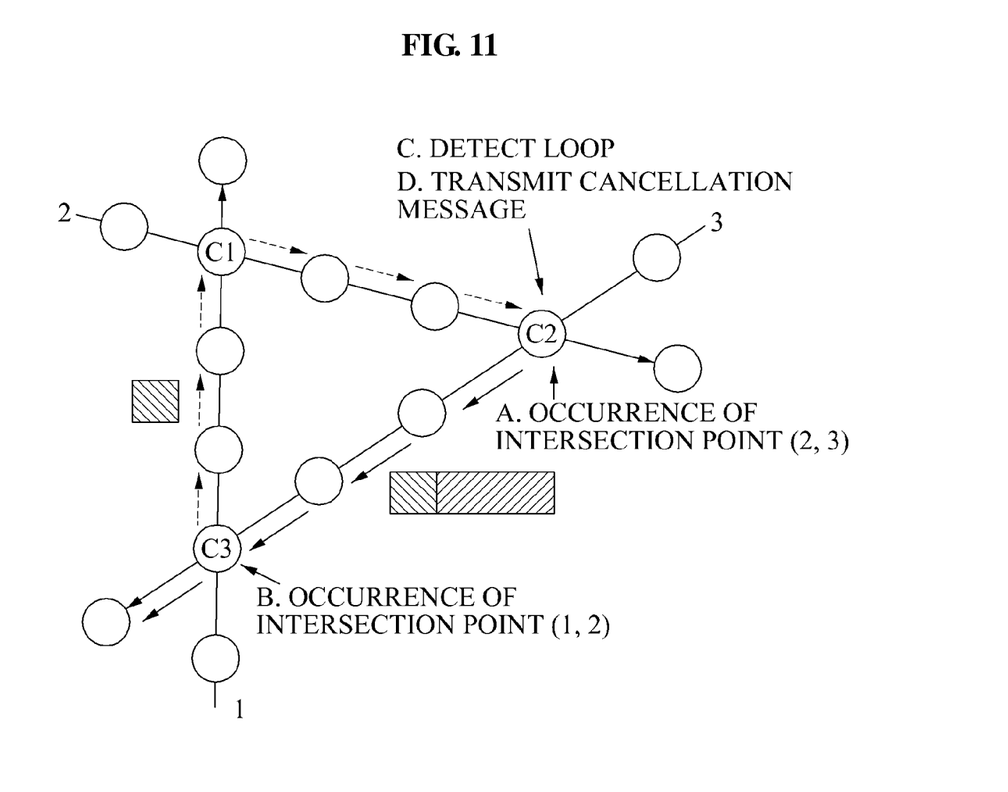
FIG. 11 is a diagram illustrating an example of a process of detecting cross nodes that form a loop and transmitting a cancellation message in a wireless network.

FIG. 11 illustrates an example of a process of detecting cross nodes that form a loop and transmitting a cancellation message in a wireless network. A wireless network includes a cross node C1, a cross node C2, and a cross node C2 that form a loop. A flow 1 and a flow 2 intersect at the cross node C1, a flow 2 and a flow 3 intersect at the cross node C2 (as shown in operation A), and a flow 1 and a flow 3 intersect at the cross node C3 (as shown in operation B). When a loop of cross nodes is formed, a network coding failure ratio increases. To prevent the network coding failure ration from increasing, a cross node detects an occurrence of a loop of cross nodes, and at least one cross node is enabled to cancel performing of network coding.

For example, when the cross node C2 is created initially, the cross node C2 transmits a notification message to the node C3 using a header of a data packet. The node C3 transmits the notification message to the node C1, individually, i.e., without using a header of a data packet. The node C1 transmits, individually, the notification message to the cross node C2 and the cross node C2 receives the notification message transmitted from itself. In this example, the cross node C2 detects that the loop of the cross nodes C1, C2, and C3 is formed (as shown in operation C), and determines to cancel performing of network coding at the cross node C2. Subsequently, the cross node C2 transmits a cancellation message to a destination node associated with a flow to inform other nodes that the performing of the network coding at the cross node C2 is cancelled (as shown in operation D).

Figure 12:
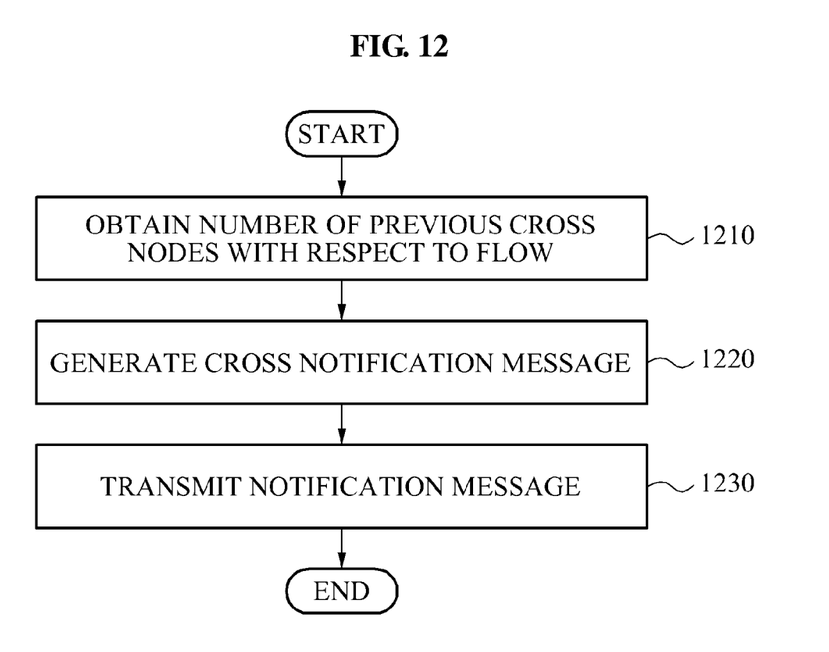
FIG. 12 is a flowchart illustrating an example of a method of generating and transmitting a notification message.

FIG. 12 illustrates an example of a method of generating and transmitting a notification message. At operation 1210, a cross node obtains or determines a number of previous cross nodes associated with a flow based on a number of cascade cross nodes associated with the flow that is included in a received notification message. At operation 1220, the cross node updates varied pieces of information (e.g., the number of cascade cross nodes) in the received notification message, to generate a new notification message, that is, a cross notification message. At operation 1230, the cross node transmits the new notification message to an adjacent node, individually or by including the notification message in a header of a data packet, which will be described in detail with reference to FIG. 13.

Figure 13:
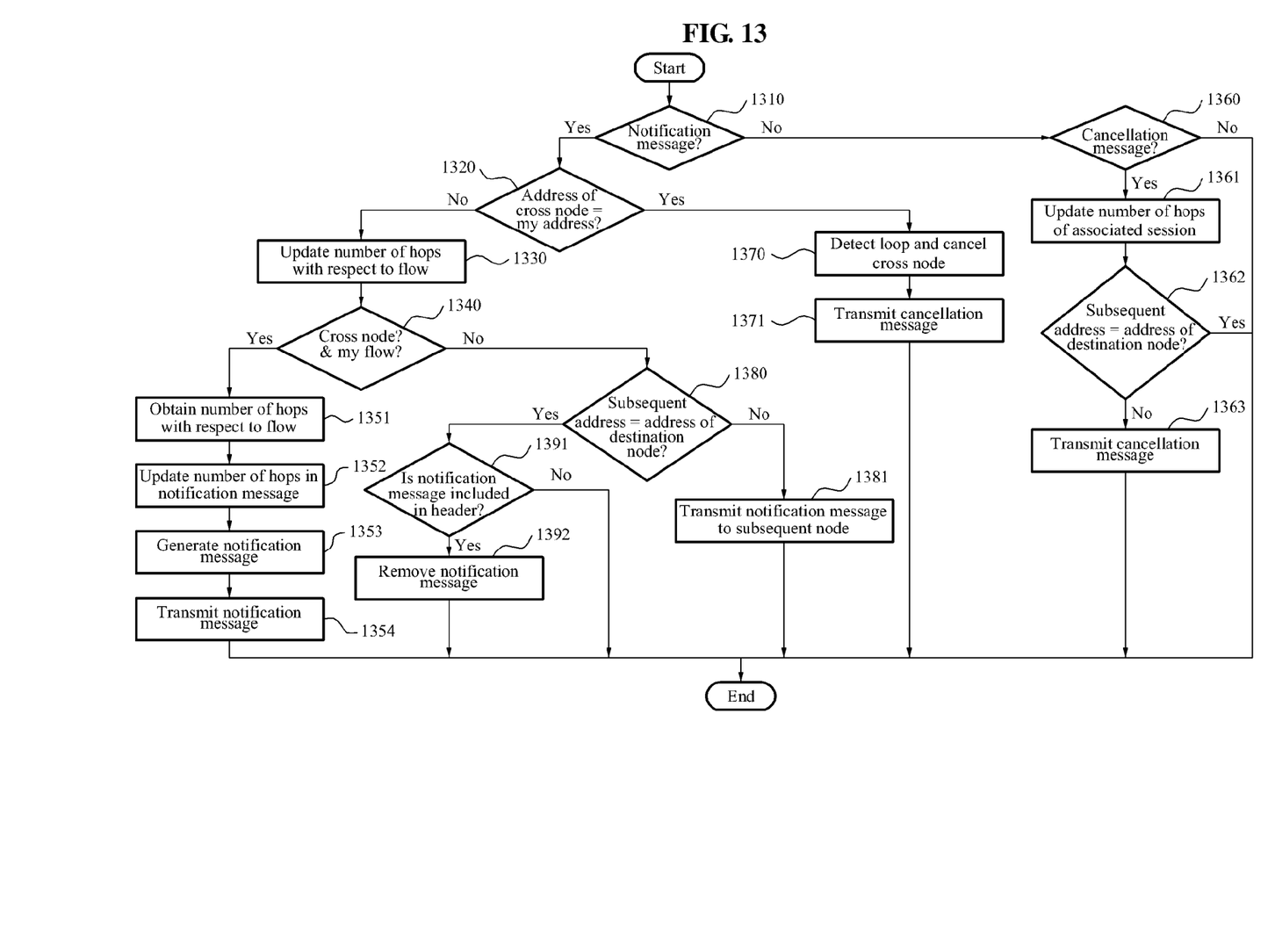
FIG. 13 is a flowchart illustrating an example of a communication method of a node included in a wireless network.

FIG. 13 illustrates an example of a communication method of a node included in a wireless network. At operation 1310, the node determines whether a received message is a notification message associated with a flow. When the received message is a notification message, the method continues at operation 1320. Otherwise, the method continues at operation 1360.

At operation 1320, the node determines whether an address of a cross node included in the notification message is an address of the node. When the address of the cross node is the address of the node, the method continues at operation 1370. Otherwise, the method continues at operation 1330.

At operation 1370, the node detects that a loop of cross nodes is formed, and cancels the node as the cross node performing network coding. At operation 1371, the node transmits a cancellation message to a destination node of an RLNC set associated with the flow and included in the notification message, to inform other nodes of the cancellation of the node as the cross node performing network coding.

At operation 1330, the node updates or determines a number of hops between a source node and the node with respect to the flow associated with the notification message. At operation 1340, the node determines, based the on an index of the RLNC set included in the notification message, whether the node is a cross node with respect to the flow, and whether the flow is associated with the node. When the node is a cross node with respect to the flow, and the flow is associated with the node, the method continues at operation 1351. Otherwise, the method continues at operation 1380.

At operation 1351, the node obtains or determines, the number of hops between the source node and the node with respect to the flow. The node may obtain an average number of hops between the source node and each cross node with respect to the flow, or a greatest number of hops among numbers of hops between the node and each source node.

At operation 1352, the node updates the number of hops between the source node and the node in the received notification message. At operation 1353, the node generates a new notification message including the updated number of hops. At operation 1354, the node transmits the notification message to an adjacent node, individually or by including the notification message in a header of a data packet.

At operation 1380, the node determines whether an address of a subsequent node is that of a destination node based on an address of the destination node that is included in the notification message. When the address of the subsequent node is different than the address of the destination node, the method continues at operation 1381. Otherwise, the method continues at operation 1391.

At operation 1381, the node transmits the notification message to the subsequent node. At operation 1391, the node determines whether the notification message is included in a header of a data packet to be transmitted to the destination node. When the notification message is included in the header, at operation 1392, the node removes the notification message from the header. Otherwise, the method ends.

At operation 1360, the determines whether the received message is a cancellation message. When the received message is the cancellation message, the method continues at operation 1361. Otherwise, the method ends.

At operation 1361, the node updates or determines a number of hops between a source device and the node of an associated session, that is, the flow. At operation 1362, the node determines whether the address of the subsequent node is the address of the destination node. When the address of the subsequent node is different from the address of the destination node, at operation 1363, the node transmits the cancellation message to the subsequent node. Otherwise, the method ends.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files including higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method executed by a cross node operating in a wireless network, the method comprising:
   determining information associated with the number of hops between a source node and the cross node and/or the number of hops between the cross node and a destination node;
   adaptively adjusting a buffering time at the cross node based on the information;
   buffering a packet received by the cross node for the adjusted buffering time; and
   performing, after the expiration of the adjusted buffering time, network coding of the buffered packet and another packet received by the cross node.

2. The method of claim 1, further comprising:
   buffering the other packet received by the cross node for the adjusted buffering time; and
   performing, after the other packet has been buffered for the adjusted buffering time, network coding of the buffered packet and the buffered other packet.

3. The method of claim 2, further comprising skipping the buffering and the performing of the network coding of the other packet, when the other packet is not received within the adjusted buffering time applied to buffering the packet.

4. The method of claim 1, wherein the adjusting comprises adaptively adjusting the buffering time to be longer than a predetermined minimum buffering time.

5. The method of claim 1, wherein the adjusting comprises:
   determining a minimum buffering time; and
   adaptively adjusting the buffering time based on the minimum buffering time.

6. The method of claim 1, wherein the adjusting comprises:
   determining an average number of hops of each path in the wireless network and/or a greatest number of hops among numbers of hops between the cross node and each of source nodes associated with packet flows intersecting at the cross node; and
   adaptively adjusting the buffering time based on the average number of hops and/or the greatest number of hops.

7. The method of claim 1, wherein the adjusting comprises:
   determining whether packets transmitted by the cross node are real-time traffic or non-real-time traffic; and
   adaptively adjusting the buffering time based on whether the packets transmitted by the cross node are the real-time traffic or the non-real-time traffic.

8. The method of claim 1, wherein the adjusting comprises:
   determining an allowable delay of a packet flow transmitted from the source node to the destination node, the number of hops between the source node and the cross node, and the number of hops between the cross node and the destination node; and
   adaptively adjusting the buffering time based on the allowable delay of the packet flow, the number of hops between the source node and the cross node, and the number of hops between the cross node and the destination node.

9. A non-transitory computer-readable storage medium storing a program comprising instructions to cause a computer to implement the method of claim 1.

10. A communication method executed by a first cross node operating in a wireless network comprising the first cross node and a second cross node, the method comprising:
    receiving, from the second cross node, a notification message comprising the number of hops between a source node and the second cross node;
    adaptively adjusting a buffering time at the first cross node based on the number of hops;
    buffering, for the adjusted buffering time, a packet received by the first cross node within a packet flow;
    performing, after the expiration of the adjusted buffering time, network coding of the buffered packet;
    updating the number of hops identified by the notification message; and
    transmitting, to a subsequent node, the updated notification message.

11. The method of claim 10, further comprising:
    receiving the updated notification message;
    detecting a loop of cross nodes comprising the first cross node when the updated notification message is received; and
    canceling network coding of packets associated with the packet flow upon detecting the loop.

12. The method of claim 11, further comprising transmitting a cancellation message to inform other nodes of the canceling of the network coding associated with the packet flow.

13. The method of claim 10, wherein the notification message comprises an address of the second cross node, an index of a set of nodes associated with the network coding, an address of the source node associated with the packet flow, an address of a destination node associated with the packet flow, a number of cascade cross nodes associated with the packet flow, or any combination thereof.

14. The method of claim 10, wherein the network coding comprises random linear network coding.

15. The method of claim 10, wherein the transmitting further comprises transmitting, to the subsequent node, the updated notification message when the subsequent node is not associated with the packet flow.

16. The method of claim 10, wherein the transmitting further comprises:
   generating a data packet comprising a header, the header comprising the updated notification message, when the subsequent node is associated with the packet flow; and
   transmitting, to the subsequent node, the data packet.

17. The method of claim 10, wherein the updating further comprises updating the number of hops between the source node and the second cross node to include a number of hops between the source node and the first cross node.

18. A non-transitory computer-readable storage medium storing a program comprising instructions to cause a computer to implement the method of claim 10.

19. An apparatus comprising:
   a processor configured to:
      determine information associated with a packet flow received by the processor,
      adaptively adjust a buffering time at the processor based on the information,
      buffer a packet received in the packet flow for the adjusted buffering time, and
      perform, after the expiration of the adjusted buffering time, network coding of the buffered packet.

20. The apparatus of claim 19, wherein the information comprises:
   an address of a cross node associated with the packet flow, an index of a set of nodes associated with network coding, an address of a source node associated with the packet flow, an address of a destination node associated with the packet flow, a number of hops between the source node and the cross node, a number of cascade cross nodes associated with the packet flow, or any combination thereof.

21. A communication method executed by a first cross-node, the method comprising:
   receiving, from a second cross-node, information of the number of hops between the first cross-node and the source or destination node of a first packet-flow;
   adaptively adjusting a buffering time at the first cross-node based upon the received information;
   receiving, from a third cross-node, a first packet communicated within a second packet-flow;
   buffering the received first packet for the adjusted buffering time; and
   transmitting to a subsequent node along the second packet-flow, after the expiration of the adjusted buffering time, either the first packet or information of the first packet within a network-coded packet.

22. The method of claim 21, further comprising:
   receiving, from the second cross-node, a second packet within the first packet-flow, while the first packet is being buffered during the adjusted buffering time;
   performing, after the expiration of the adjusted buffering time, network coding of the first and second packets to produce the network-coded packet; and
   transmitting the network-coded packet to the subsequent node along the second packet-flow.

\* \* \* \* \*